3,792,074
2,4,6-CYCLOHEPTATRIEN-1-YL DITHIOCARBAMIC ACID ESTERS

Yoshihachi Watababe, Shiga, and Kentaro Hirai, Kyoto, Japan, assignors to Shionogi & Co., Ltd., Osaka Prf., Japan
No Drawing. Filed May 5, 1972, Ser. No. 250,822
Int. Cl. C07c 155/08
U.S. Cl. 260—455 A                    9 Claims

ABSTRACT OF THE DISCLOSURE

Dithiocarbamic acid derivatives represented by the general formula:

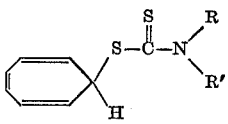

wherein R and R' are the same or different and each represents a hydrogen atom, lower alkyl group, aryl group or, taken together with the nitrogen atom, a 5- or 6-membered heterocyclic ring containing at the most one further oxygen or sulfur atom, being useful as agricultural chemicals having fungicidal action.

---

This invention relates to a novel class of dithiocarbamic acid derivatives, to a process for their manufacture, and to compositions of them for agricultural use.

More particularly, this invention relates to cycloheptatrienyl dithiocarbamates having agriculturally valuable fungicidal action.

The cycloheptatrienyl dithiocarbamates of this invention are represented by the general Formula I:

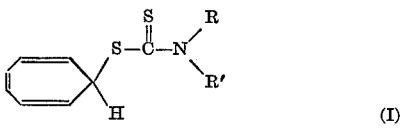

wherein R and R' being the same or different and each is a member selected from the group consisting of hydrogen atom, lower alkyl group, and aryl group, or taken together with the nitrogen atom, a 5- or 6-membered heterocyclic ring containing at the most one further oxygen or sulfur atom.

By "lower alkyl" is meant alkyl groups having up to six carbon atoms, thus including methyl, ethyl, n-propyl, iso-propyl, n-butyl, sec-butyl, iso-butyl, n-heptyl, n-hexyl and the like. By "aryl" is meant substituted or unsubstituted phenyl groups, thus including phenyl, o-, m- or p-methoxyphenyl, o-, m- or p-tolyl, o-, m- or p-chlorophenyl, o-, m- or p-nitrophenyl and the like. The 5- or 6-membered heterocyclic ring can be pyrrolidino, piperidino, morpholino, thiomorpholino or the like.

The objective dithiocarbamic acid derivatives (I) can be prepared by reacting a tropylium salt of the general Formula II with a dithiocarbamic acid or salt thereof of the general Formula III as illustrated in the accompanying equation.

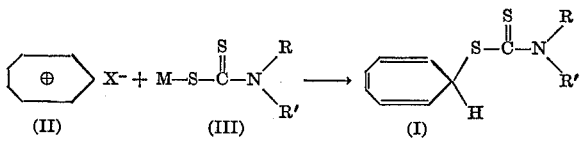

(wherein M is a member selected from the group consisting of quaternary ammonium groups and alkali metal atom; X is an acid residue; R and R' have the meanings given above).

The starting tropylium salts (II) are known compounds and may readily be prepared from cycloheptatrien [J. Am. Chem. Soc., 79, 4557 (1959)]. The acid residue defined by the symbol X⁻ can be halogen ion such as chlorine ion (Cl⁻), bromine ion (Br⁻), iodine ion (I⁻), etc., boron tetrafluorine ion ($BF_4^-$), boron tetrabromide ion ($BBr_4^-$), perchloric acid residue ($ClO_4^-$), sulfuric acid residue ($HSO_4^-$), chromic acid residue ($HCrO_4^-$) and the like.

The starting dithiocarbamic acid salts (III) are known compounds and may be prepared by the reaction of primary or secondary amines or ammonia of the general formula

(wherein R and R' have the meanings given above) with carbon disulfide. The quaternary ammonium group defined by the symbol M may be those of primary, secondary or tertiary amine, such as methylamine, ethylamine, n-propylamine, dimethylamine, diethylamine, di-n-propylamine, pyrrolidine, piperidine, morpholine, thiomorpholine, N-methyl-N-phenylamine, triethylamine, N,N-dimethylaniline, triethylenediamine pyridine, picoline, collidine and the like. The alkali metal atom defined by the symbol M may be lithium, sodium or potassium.

The reaction of the invention is preferably carried out in a suitable solvent, more particularly in an aprotic solvent, at room temperature or under heating (a temperature up to 200° C.) with stirring. Preferred solvents are hydrocarbons such as benzene, toluene, xylene and the like, ketones such as acetone, methyl ethyl ketone and the like, ethers such as dioxane, tetrahydrofuran, glyme and the like, and other aprotic organic solvents such as pyridine, picoline, collidine, dimethyl sulfoxide, N,N-dimethylformamide and the like.

The resulting dithiocarbamic acid derivatives (I) can readily be recovered from the reaction mixture and purified by conventional means such as evaporation, extraction, recrystallization, chromatography and the like.

Representative of the dithiocarbamic acid derivatives (I) are:

(1) 2,4,6-cycloheptatrien-1-yl N,N-dimethyldithiocarbamate,
(2) 2,4,6-cycloheptatrien-1-yl N,N-diethyldithiocarbamate,
(3) 2,4,6-cycloheptatrien-1-yl N,N-di-n-propyldithiocarbamate,
(4) 2,4,6-cycloheptatrien-1-yl N,N-di-isopropyldithiocarbamate,
(5) 2,4,6-cycloheptatrien-1-yl N,N-di-n-hexyldithiocarbamate,
(6) 2,4,6-cycloheptatrien-1-yl N-methyl-N-isopropyldithiocarbamate,
(7) 2,4,6-cycloheptatrien-1-yl dithiocarbamate,
(8) 2,4,6-cycloheptatrien-1-yl N,N-diphenyldithiocarbamate,
(9) 2,4,6-cycloheptatrien-1-yl N-methyl-N-phenyldithiocarbamate,
(10) 2,4,6-cycloheptatrien-1-yl N-methyl-N-p-methoxyphenyldithiocarbamate,
(11) 2,4,6-cycloheptatrien-1-yl N-ethyl-N-m-chlorophenyldithiocarbamate,
(12) 2,4,6-cycloheptatrien-1-yl morpholinocarbodithioate,
(13) 2,4,6-cycloheptatrien-1-yl thiomorpholinocarbodithioate,
(14) 2,4,6-cycloheptatrien-1-yl piperidinocarbodithioate, and
(15) 2,4,6-cycloheptatrien-1-yl pyrrolidinocarbodithioate.

The dithiocarbamic acid derivatives (I) of this invention have potent fungicidal action against various kinds of pathogenic fungi such as cucurbitaceous anthracnose fungi, cucurbitaceous powder mildew fungi, rice sheath blight fungi, cucurbitaceous damping-off fungi, and the like.

TEST 1

Test for control of anthracnose of cucurbitaceous vegetables.
Vegetable tested: Suyo variety of cucumber.

Test method

Seeds of Suyo cucumber were washed with water, kept at 28° C. for 24 hours to hasten germination, then sown in vinyl chloride-cups of 9 cm. in diameter, one seed per cup. After 18 days, when the primary leaf was developed, solutions of the test compounds at predetermined concentration were applied, 5 ml. per cup, and the cups were kept in a green-house at 80% humidity for 24 hours.

A cucumber anthracnose pathogenic fungus (*Collectorichum lagenarium*) was cultured on a potato-dextrose-agar plate for 7 days, and the spore formed was diluted to a predetermined concentration under sterile conditions to give a spore suspension. This suspension was inoculated onto the aforementioned primary leaves of cucumber, 5 spots per leaf, 24 hours after the treatment with test compounds. The cups were kept at 25° C. and 95% humidity for 24 hours, then allowed to stand for 6 days in a green-house at 25° C. and 75–80% humidity.

The rate and frequency of fungal affection were then observed. The results are indicated in Table I in terms of the rate (percent) of control of formation of affected spots (percent disease control).

TABLE I

| Compound | Concentrate, p.p.m. | Rate (percent) of affection | Frequency of affection | Disease control (percent) |
|---|---|---|---|---|
| Compound (1) | 100 | 20 | 22 | 78 |
|  | 250 | 0 | 0 | 100 |
|  | 500 | 0 | 0 | 100 |
| Daisen | 1,625 | 0 | 0 | 100 |
| Untreated |  | 100 | 100 | 0 |

NOTE:
Rate of affection = Percentage of leaves affected.
Frequency of affection = Number of affected spots.
Disease (percent) control $$= \frac{\text{Frequency of affection in untreated plot} - \text{Frequency of affection in treated plot}}{\text{Frequency of affection in untreated plot}} \times 100.$$

Daisen = Zinc ethylenebisdithiocarbamate.

As indicated in Table I, the dithiocarbamic acid derivatives (I) of this invention are very effective in controlling cucumber anthracnose; moreover, they are more effective in a low concentration than the commercially available agricultural chemical Daisen.

TEST 2

Test for control of powdery mildew of cucurbitaceous vegetables.
Vegetable tested: Suyo variety of cucumber.

Test method

Protective test.—Seeds of Suyo cucumber were kept at 28° C. for 24 hours to hasten germination, then sown in vinyl chloride cups of 9 cm. in diameter, two seeds per cup. Ten days after sowing, a solution of the test compound at a predetermined concentration was applied (10 ml. per cup) to the cotyledons and the cups were kept in a green-house at 25–26° C. for 24 hours.

Leaves of cucumber affected by the powdery mildew pathogenic fungus *Sphaerotheca fuliginea* were taken and areas covered with oidium were cut out in 1 cm.² pieces. The cotyledons in the cups were inoculated with fungus by applying the oidium covered pieces onto them, one piece per cut. The cups were then kept in a greenhouse at 25–26° C. for 7 days. Oidium formed on the cotyledons was measured by microscope.

Therapeutic test.—Seeds of Suyo cucumber were treated and sown in cups in the same manner as in Protective test.

Primary leaves of plants which had been infected by the pathogenic fungus at the cotyledon stage 10 days after sowing were cut into 1 cm.² pieces. The cotyledons in the cups were inoculated with fungus by applying these leaf pieces, one piece per cup. The cups were then kept in a greenhouse at 25–26° C. for 7 days. A solution of the test compound at a predetermined concentration was applied (10 ml. per cup) to the pathogen affected spots, and the cups were kept in a greenhouse under the same conditions as mentioned above for 7 days. Oidium formation was observed by microscope.

TABLE II

| Compound | Concentrate, p.p.m. | Appearance of oidium on inoculated leaves— | |
|---|---|---|---|
| | | Protective test | Therapeutic test |
| Compound (1) | 500 | − | − |
| Euparen | 625 | − | ± |
| Untreated | | +++ | +++ |

NOTE:
Plus = Affected spots and formation of large numbers of oidia observed on the inoculated portions.
Plus minus = No affected spots observed, a few oidia detected.
Minus = Neither affected spots nor oidium formation observed.
Euparen = N,N-Dimethyl-N′-phenyl-N′-dichlorofluoromethyl-thiosulfonyldiamide.

As indicated in Table II, the ditiocarbamic acid derivatives (I) of this invention show approximately the same activity against cucumber powdery mildew as the commercially available agricultural chemical Euparen.

TEST 3

Test for controlling sheath blight of lowland rice plant.
Variety of rice plant tested: Aichi-Asahi rice plant.

Test method

Seeds of the rice plant were washed with water and kept at 28° C. to hasten germination. Ten days after germination the seedlings were planted in 20 cm. diameter Wagner pots, 5 plants per pot, and later transplanted. The plants were used for test 50 days after transplanting. A sheath blight pathogenic fungus used for inoculation (*Pellicularia sasaki*) was cultured on a potato-dextrose-agar plate for 2 days.

Protective test.—40 ml. of solution of the test compound at a predetermined concentration was applied each pot. After 24 hours, five leaf sheaths of each plant were inoculated with the sheath blight fungus, and then the plants were kept at 28–30° C. and more than 95% humidity for 4 days, then at 28° C. for 5 days. The lengths of the affected regions were then observed.

Therapeutic test.—The sheath blight pathogenic fungus was inoculated on rice leaf sheathes as described in the Protective test, and the plants were kept at 28–30° C. and more than 95% humidity for 24 hours. Then, a solution of the test compound at a predetermined concentration was applied (40 ml. per pot) to the inoculated portions of each leaf sheath, and the pots were kept under the aforementioned conditions for 3 days and then at 28° C. for 5 days. The lengths of affected regions were then observed.

The results are indicated in Table III in terms of the rate (percent) of control of formation of spots (control factor).

TABLE III

| Compound | Concentrate, p.p.m. | Protective test | | Therapeutic test | |
|---|---|---|---|---|---|
| | | Length of affected region (mm.) | Control factor (percent) | Length of affected region (mm.) | Control factor (percent) |
| Compound (1) | 500 | 96 | 93.1 | 43 | 97.1 |
| Neoasozin | 42 | 50 | 96.4 | 65 | 96.9 |
| Untreated | | 1,400 | 0 | 2,067 | 0 |

NOTE.—Control factor (disease control percent) = $\dfrac{\text{Length of affected region in untreated plot} - \text{in treated plot}}{\text{Length of affected region in untreated plot}} \times 100$.

Neoasozin = Ferric ammonium methylarsonate.

As indicated in Table III, the dithiocarbamic acid derivatives (I) of this invention show approximately the same activity against rice sheath blight as the commercially available agricultural chemical Neoasozin.

TEST 4

Test for control of damping-off of cucumber.
Variety of cucumber tested: Suyo cucumber.

Test method

A pathogenic fungus of cucumber damping-off (*Fusarium oxysporum* f. *cucumerinum*) was cultivated in a corn-meal-sand medium. The infected medium (1 part) was mixed with sterile soil (9 parts) and this soil was placed in 6 cm. diameter unglazed pots. The pots were then kept in a greenhouse at 28° C. 10 ml. of a solution of the test compound at a predetermined concentration was applied to each pot twice a day every other day. Twenty four hours after the last treatment, 20 cucumber seeds which previously had been treated to hasten germination were sown in each pot (two pots per plot). The pots were kept in a green-house at 28° C. for 10 days, and the appearance of seedlings was observed. Table IV indicates the results in terms of occurrence (percent) of germination and damping-off in the seedlings.

TABLE IV

| Compound | Concentrate, p.p.m. | Occurrence of— | |
|---|---|---|---|
| | | Germination (percent) | Dmp-off (percent) |
| Compound (1) | 500 | 100.0 | 0 |
| Carbamizol | 600 | 95.0 | 5.0 |
| Untreated | | 7.5 | 92.5 |

Note:
Germ. = Germination.
Dmp-off = Damping-off.
Carbamizol = Ammonium N,N-dimethyldithiocarbamate.

As indicated in Table IV, the dithiocarbamic acid derivatives (I) of this invention show approximately the same activity against cucumber damping-off as the commercially available agricultural chemical Carbamizol. However, though in the plot treated with Carbamizol growth inhibition was observed; no growth inhibition was observed in the plot treated with the Compounds I of this invention.

In using the dithiocarbamic acid derivatives (I) of this invention as fungicides, it is appropriate to apply them as compositions containing 5–95% by weight of the derivatives (I) mixed with suitable carriers or diluents. These may be solid or liquid and may include materials, such as vegetable dusts (e.g. soya bean powder, tobacco dust, wood dust, walnut dust, wheat flour), mineral dusts (e.g. sulfur, diatom earth, calcium lime, magnesium lime, apartite, calcite, dolomite, gypsum, mica, talc, pyrophyllite, clays, kaolin, kaolinite, nacrite, dickite, anauxite, bentonite, saponite, nontronite, beidellite, montmorillonite, attapulagite, sepiolite, pumice, vermiculite) and solvents (e.g. water, methanol, ethanol, n-hexanol, ethylene glycol, acetone, methyl ethyl ketone, Cellosolve, Cellosolve acetate, tetrahydrofuran, glyme, dioxane, N,N-dimethylformamide, dimethyl sulfoxide). In order to increase the effect of the compositions, it is also appropriate to use supplementary agents such as emulsifying agents, dispersants, stickers, fixatives, wetting and spreading agents, stabilizing agents, synergists and the like. Examples of the supplementary agents are nonionic, anionic or cationic surface-activating agents such as polyoxyethylene alkyl aryl ethers, alkyl allyl polyethylene glycol ethers, alkyl allyl sorbitan monolaurate, alkyl allyl sulfonates, higher alcohol sulfates, alkyl dimethyl benzylammonium halides and the like, lignin sulfonates, dinaphthylmethane disulfonate-formalin condensates, stearates, polyvinyl alcohols, sodium carboxymethyl cellulose (CMC), gum arabic and the like. Moreover, the Compounds I of this invention may be used in combination with other agricultural chemicals such as other fungicides, insecticides, herbicides, repellants, miticides, nematocides, plant growth regulators and the like.

Furthermore, the Compound I may be applied in a form suitable for agricultural chemicals, such as solution, dust, emulsion, suspension, wetting powder, granules, aerosol, oil, smoke, paste and the like.

In applying compositions containing the dithiocarbamic acid derivatives (I) as active ingredients, they may be diluted further with the suitable diluents mentioned above so that the concentration of the active ingredient is in the range 50–2,000 p.p.m., more particularly 100–1,000 p.p.m.

The invention will be better explained by the following examples which are not intended as a limitation thereof.

EXAMPLE 1

A mixture of 1.8 g. of tropylium tetrafluoroborate, 2 g. of sodium N,N-dimethyldithiocarbamate, and 100 ml. of acetone is stirred at room temperature for 20 minutes and then evaporated to dryness. Water is added, and the mixture extracted with chloroform. The extract is dried, evaporated to dryness, and recrystallized from ether to yield 1.95 g. of 2,4,6-cycloheptatrien-1-yl N,N-dimethyldithiocarbamate having M.P. 121–123° C. Yield 92.5%. Anal. Calcd. for $C_{10}H_{13}NS_2$: C, 56.83%; H, 6.20%; N, 6.63%; S, 30.34%. Found: C, 56.74%; H, 6.25%; N, 6.42%; S, 30.58%.

EXAMPLE 2

A mixture of 0.96 g. of tropylium perchlorate, 1.45 g. of morpholinocarbodithioic acid morpholinium salt, and 8.0 ml. of acetonitrile is stirred at room temperature for 30 minutes, and then evaporated to dryness under reduced pressure. The resulting residue is extracted with ether, and the extract dried over magnesium sulfate and evaporated to dryness. The residue is crystallized from ethanol to yield 0.89 g. of 2,4,6-cycloheptatrien-1-yl morpholinocarbodithioate having M.P. 85–88° C. (decomp). Yield 72%. Anal. calcd. for $C_{12}H_{15}NOS_2$: C, 56.92%; H, 5.93%; N, 5.53%; S, 25.30%. Found: C, 57.94%; H, 6.15%; N, 5.00%; S, 25.26%.

EXAMPLE 3

A mixture of 0.96 g. of tropylium perchlorate, 1.4 g. of sodium N,N-diethyldithiocarbamate, and 6.0 ml. of acetonitrile is treated in the same manner as in Example 2.

The product is recrystallized from ethanol to yield 0.59 g. of 2,4,6-cycloheptatrien-1-yl N,N-diethyldithiocarbamate having M.P. 75–80° C. (decomp). Yield 54%. Anal. calcd. for $C_{12}H_{17}NS_2$: C, 60.25%; H, 7.11%; N, 5.86%; S, 26.78%. Found: C, 59.91%; H, 7.20%; N, 6.09%; S, 25.55%.

EXAMPLE 4

A mixture of 0.80 g. of tropylium perchlorate, 1.58 g. of N,N-di-n-propyldithiocarbamic acid di-n-propylammonium salt and 10 ml. of acetonitrile is treated in the same manner as in Example 2. The product is recrystallized from ethanol to yield 1.1 g. of 2,4,6-cycloheptatrien-1-yl N,N-di-n-propyldithiocarbamate having M.P. 46.5–47.0° C. Yield 97%. Anal. calcd. for $C_{14}H_{20}NS_2$: C, 62.90%; H, 7.92%; N, 5.24%; S, 23.94%. Found: C, 62.68%; H, 7.90%; N, 5.48%; S, 23.90%.

EXAMPLE 5

A mixture of 0.90 g. of tropylium perchlorate, 0.60 g. of dithiocarbamic acid ammonium salt, and 7.0 ml. of acetonitrile is treated in the same manner as in Example 2. The product is recrystallized from ethanol to yield 0.29 g. of 2,4,6 - cycloheptatrien-1-yl dithiocarbamate having M.P. 122–124° C. (decomp). Yield 33%. Anal. calcd. for $C_8H_9NS_2$: C, 52.46%; H, 4.92%; N, 7.65%; S, 34.97%. Found: C, 52.92%; H, 5.04%; N, 7.17%; S, 35.01%.

EXAMPLE 6

A mixture of 0.80 g. of tropylium perchlorate, 1.1 g. of sodium N-methyl-N-phenyldithiocarbamate and 6.0 ml. of acetonitrile is treated in the same manner as in Example 2. The product is recrystallized from methanol to yield 0.28 g. of 2,4,6-cycloheptatrien-1-yl N-methyl-N-phenyldithiocarbamate having M.P. 94–95° C. Yield 40%. Anal. calcd. for $C_{15}H_{15}NS_2$: C, 65.92%; H, 5.53%; N, 5.13%; S, 23.43%. Found: C, 66.33%; H, 5.60%; N, 4.70%; S, 23.03%.

EXAMPLE 7

A mixture of 0.85 g. of tropylium perchlorate and 0.51 g. of sodium N-methyl-N-p-methoxyphenyldithiocarbamate is treated in the same manner as in Example 2. The product is recrystallized from methanol to yield 0.44 g. of 2,4,6 - cycloheptatrien - 1 - yl N-methyl-N-p-methoxyphenyldithiocarbamate having M.P. 147.5–148.5° C. Yield 56%. Anal. calcd. for $C_{16}H_{17}NOS_2$: C, 63.37%; H, 5.61%; N, 4.62%; S, 21.12%. Found: C, 63.40%; H, 5.87%; N, 4.62%; S, 21.18%.

EXAMPLE 8

| | Parts by weight |
|---|---|
| 2,4,6 - cycloheptatrien-1-yl N,N-dimethyldithiocarbamate (Compound 1) | 5 |
| Ethylene glycol | 10 |
| Methanol | 30 |
| Polyoxyethylene alkyl aryl ether | 5 |
| Water | 50 |

This solution is prepared by blending each component until substantially the solid material is dissolved transparently.

For application, this solution is diluted with water so that the content of the effective ingredient is in the range 50–1000 p.p.m.

EXAMPLE 9

| | Parts by weight |
|---|---|
| 2,4,6 - cycloheptatrien-1-yl N,N-dimethyldithiocarbamate (Compound 1) | 40 |
| Talc | 49 |
| Sodium alkyl benzene sulfonate | 1 |

A wettable powder is prepared by blending the dry component and grinding until substantially all of the particles are smaller than 50 microns.

For application, this wettable powder is dispersed in water so that the content of the effective ingredient is in the range 50–1000 p.p.m.

In the above example, similar formulations are prepared containing 10–80 parts by weight of the Compounds 2, 3, 4, 5, 6, 8, 9, 10, and 11.

EXAMPLE 10

| | Parts by weight |
|---|---|
| 2,4,6 - cycloheptatrien-1-yl dithiocarbamate (Compound 7) | 10 |
| Talc | 80 |
| Polyvinyl alcohol | 8 |
| Alkyl allyl polyethylene glycol ether | 2 |

A dust is prepared by first grinding together the Compound 7, polyvinyl alcohol and alkyl allyl polyethylene glycol ether and then blending in the talc and thoroughly mixing.

EXAMPLE 11

| | Parts by weight |
|---|---|
| 2,4,6 - cycloheptatrien-1-yl morpholinocarbodithioate (Compound 12) | 50 |
| Bentonite | 49 |
| Sodium alkyl benzene sulfonate | 1 |

A wettable powder is prepared in the same manner as in Example 9. For application, this wettable powder is dispersed in water so that the content of the effective ingredient is in the range 50–1000 p.p.m.

In the above example, similar formulations are prepared containing 10–90 parts by weight of the Compounds 13, 14, and 15.

What is claimed is:

1. A compound represented by the formula:

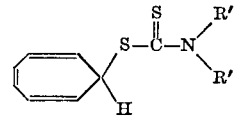

wherein R and R' each is the same or different and represents hydrogen, a lower alkyl group having up to six carbon atoms, phenyl or methoxyphenyl.

2. A compound according to claim 1, namely a 2,4,6-cycloheptatrien-1-yl N,N-di(lower-alkyldithiocarbamate.

3. 2,4,6-cycloheptatrien-1-yl N,N-dimethyldithiocarbamate.

4. 2,4,6 - cycloheptatrien-1-yl N,N-diethyldithiocarbamate.

5. 2,4,6 - cycloheptatrien-1-yl N,N-di-n-propyldithiocarbamate.

6. 2,4,6-cycloheptatrien-1-yl dithiocarbamate.

7. 2,4,6-cycloheptatrien-1-yl N-methyl-N-phenyldithiocarbamate.

8. 2,4,6 - cycloheptatrien-1-yl N-methyl-N-p-methoxyphenyldithiocarbamate.

9. A process for preparing a compound represented by the formula:

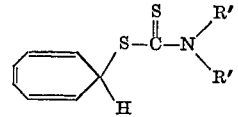

wherein R and R' each is the same or different and represents hydrogen, a lower alkyl group having up to six carbon atoms, phenyl or methoxyphenyl which comprises reacting a tropylium salt represented by the formula:

wherein X represents an inorganic acid residue with a compound represented by the formula:
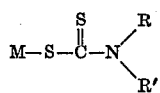
wherein M represents a quaternary ammonium group or alkali metal; and R and R' each has the same meaning as described above.
References Cited
UNITED STATES PATENTS
3,224,863  12/1965  D'Amico _____ 260—455 A
LEWIS GOTTS, Primary Examiner
D. R. PHILLIPS, Assistant Examiner
U.S. Cl. X.R.
260—247.1, 246; 424—248, 270, 272

UNITED STATES PATENT OFFICE
CERTIFICATE OF CORRECTION

Patent No. 3,792,074          Dated February 12, 1974

Inventor(s) Yoshihachi Watanabe, and Kentaro Hirai

It is certified that error appears in the above-identified patent and that said Letters Patent are hereby corrected as shown below:

Under the Title, change "Yoshihachi Watababe" to

-- Yoshihachi Watanabe --.

Signed and sealed this 16th day of July 1974.

(SEAL)
Attest:

McCOY M. GIBSON, JR.
Attesting Officer

C. MARSHALL DANN
Commissioner of Patents